UNITED STATES PATENT OFFICE.

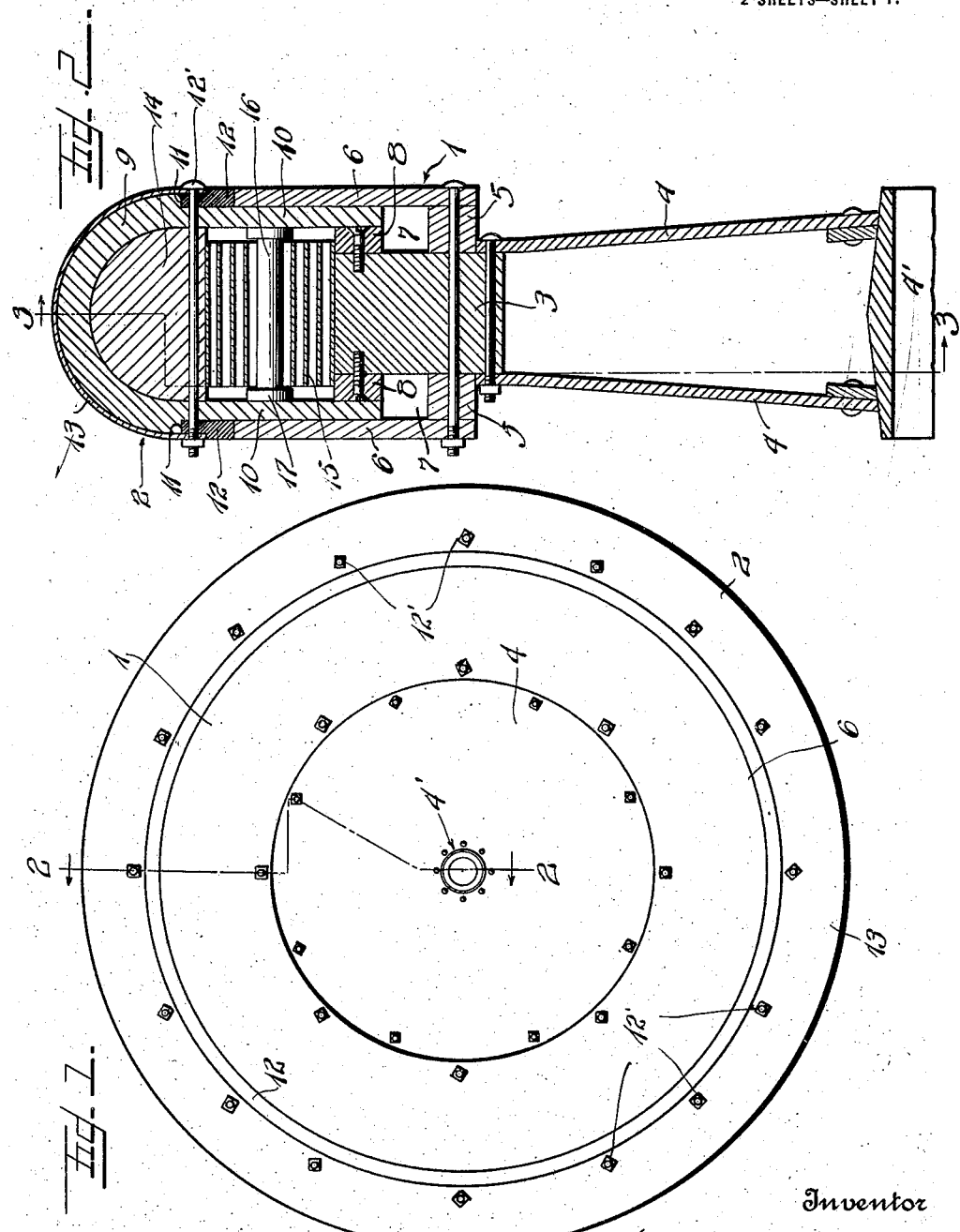

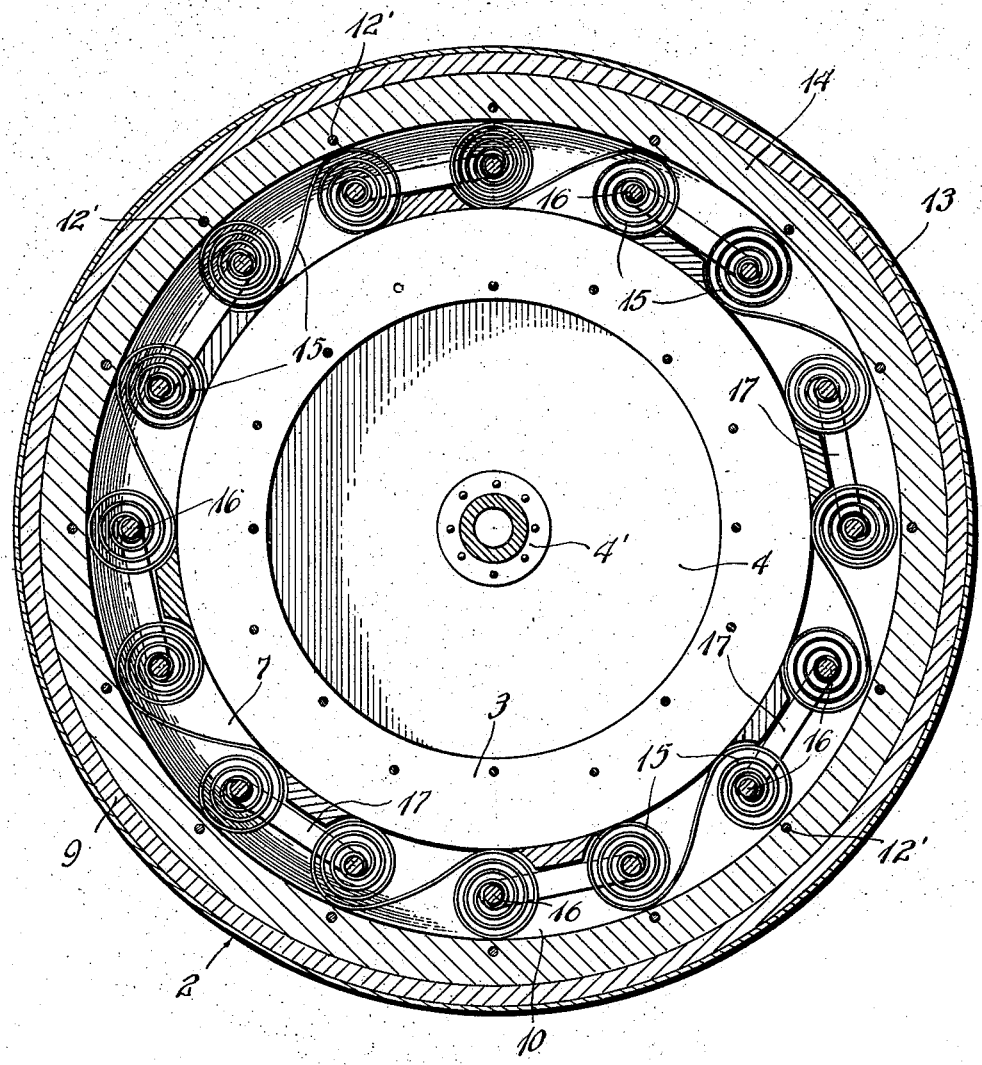

GEORGE ORBIN, OF MILWAUKEE, WISCONSIN, ASSIGNOR OF ONE-THIRD TO JOHN MILROY JONES, OF MILWAUKEE, WISCONSIN.

SPRING-WHEEL.

1,313,501.      Specification of Letters Patent.      Patented Aug. 19, 1919.

Application filed February 6, 1918, Serial No. 215,613. Renewed March 10, 1919. Serial No. 281,814.

*To all whom it may concern:*

Be it known that I, GEORGE ORBIN, a citizen of the United States, residing at Milwaukee, in the county of Milwaukee and State of Wisconsin, have invented certain new and useful Improvements in Spring-Wheels; and I do declare the following to be a full, clear, and exact description of the invention, such as will enable others skilled in the art to which it appertains to make and use the same.

This invention relates to certain new and useful improvements in spring wheels, and has for its primary object to provide a wheel of this character in which the springs are disposed entirely within the rim portion of the wheel so that dust, dirt and the like will not collect upon the same.

Another object of the invention is to provide a spring wheel having a number of separate springs which are connected together in such a manner as to form an annular series of springs.

A still further object of the invention is to generally improve upon devices of this class by the provision of a comparatively simple, strong, durable and inexpensive construction, one which will be efficient and reliable in operation, and well adapted to the purpose for which it is designed.

With these and other objects in view, the invention consists of certain novel features of construction, and the combination and arrangement of parts as will be hereinafter fully described and claimed.

In the accompanying drawings in which similar reference characters are used to designate like parts throughout the several views:

Figure 1 is a side elevation of a wheel constructed in accordance with this invention;

Fig. 2 is a transverse sectional view of a portion of the wheel, said view being taken substantially on the line 2—2 of Fig. 1; and, Fig. 3 is a section taken on the line 3—3 of Fig. 3.

This invention contemplates the use of an inner rim 1 and an outer rim 2. The inner rim 1 comprises a felly member 3 to which a pair of side plates or disks 4 are bolted to connect the felly to the hub 4'. However, it is to be understood that any other suitable spoke device may be used.

Bolted to the felly 3 and spaced therefrom by rings 5 are annular side plates 6, the latter extending outwardly beyond the peripheral edge of the felly 3, and having portions disposed opposite to the opposite sides of the latter to form channels 7 between them and said felly. Rings 8 are secured in any suitable manner to the felly 3 at the peripheral edge of the same.

The outer rim 2 comprises a U-shaped metallic body 9, the side walls 10 of which form annular side plates which are disposed between and in sliding contact with the side plates 6 of the inner rim 1. The side walls or plates 10 extend inwardly of the outer rim 2 and have their inner edges disposed in the channels 7 between the plates 6 and the rings 8.

The opposite sides of the outer rim member 9 are provided with annular shoulders 11, the latter being disposed in opposing relation to the outer edges of the side plates 6, and disposed in this space and bolted to the outer rim are annular compressible rings 12. The bolts 12' which secure these rings 12 to the member 9 pass through a rubber covering 13 for the tread portion of the member 9, and also through a core 14 which is disposed between the side walls of the member 9 adjacent the tread portion of the same.

Disposed between the inner rim 1 and the outer rim 2 and bearing against the periphery of the felly 3 and the inner edge of the core 14 is a plurality of flat double spiral springs 15. These springs 15 are wound around pins 16 which project beyond the side edges of the same and are connected to link members 17 which couple the adjacent springs together so as to form a connected annular series of springs. Thus all of the springs to be disposed in the wheel may be coupled together prior to the assembling of the entire device.

In use, it will be obvious that the springs 15 will absorb the shocks and jars from the bed of the vehicle when the same is passing over a road, in a more effective manner than do pneumatic tires, and since the device is more durable than pneumatic tires, the expense of running a heavy vehicle has been diminished.

From the foregoing description, taken in connection with the accompanying drawings, the construction, use and operation of the invention will be readily understood without a more extended explanation.

As various changes in form, proportion and in the minor details of construction may be resorted to without departing from the spirit of this invention, it is to be understood that I do not wish to be limited to the construction herein shown and described other than as claimed.

I claim:

1. A spring wheel of the class described comprising an inner rim having outwardly extending annular side plates, an outer rim having inwardly extending annular side plates disposed between the latter and in sliding contact therewith, springs disposed between said rims, annular shoulders formed on the outer sides of the outer rim, said shoulders being disposed in opposing relation to the outer edges of the first named side plates, and annular compressible strips disposed between the latter and said shoulders.

2. A spring wheel comprising an inner rim and an outer rim, a plurality of double spiral springs disposed between said rims, pins around which said springs are wound, said pins having their ends projecting beyond the side edges of said springs, and links connected to the ends of said pins to connect the adjacent springs together to form an annular connected series of springs.

In testimony whereof I have hereunto set my hand.

GEORGE ORBIN.

Copies of this patent may be obtained for five cents each, by addressing the "Commissioner of Patents, Washington, D. C."